US 6,567,552 B2

(12) United States Patent
Sakaguchi et al.

(10) Patent No.: US 6,567,552 B2
(45) Date of Patent: May 20, 2003

(54) IMAGE PROCESSING METHOD AND APPARATUS (75) Inventors: Katsuhiko Sakaguchi, Kawasaki (JP); Hatsuo Machida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/988,778

(22) Filed: Dec. 11, 1997

(65) Prior Publication Data

US 2001/0043743 A1 Nov. 22, 2001

(30) Foreign Application Priority Data

Dec. 17, 1996 (JP) .............................................. 8-353341

(51) Int. Cl.[7] .................................................. G06K 9/62
(52) U.S. Cl. ........................ 382/225; 382/186; 382/187; 382/204; 382/226
(58) Field of Search ................................. 382/159, 187, 382/218, 224, 225, 226, 181–186, 188–189, 202–203

(56) References Cited

U.S. PATENT DOCUMENTS

| | | | | |
|---|---|---|---|---|
| 5,075,896 A | * | 12/1991 | Wilcox et al. ............... | 382/225 |
| 5,187,751 A | * | 2/1993 | Tanaka ........................ | 382/225 |
| 5,315,668 A | * | 5/1994 | O'hair ......................... | 382/159 |
| 5,550,931 A | * | 8/1996 | Bellegarda et al. .......... | 382/187 |
| 5,577,135 A | * | 11/1996 | Grajski et al. ............... | 382/253 |
| 5,594,810 A | * | 1/1997 | Gourdol ...................... | 382/187 |
| 5,613,019 A | * | 3/1997 | Altman et al. ............... | 382/311 |
| 5,844,991 A | * | 12/1998 | Hochberg et al. ........... | 382/218 |
| 5,926,567 A | * | 7/1999 | Collins et al. ............... | 382/187 |
| 5,937,093 A | * | 8/1999 | Takahashi .................... | 382/226 |
| 5,963,666 A | * | 10/1999 | Fujisaki et al. .............. | 382/187 |
| 5,991,441 A | * | 11/1999 | Jourjine ....................... | 382/187 |
| 6,041,137 A | * | 3/2000 | Van Kleeck ................. | 382/185 |
| 6,052,481 A | * | 4/2000 | Grajski et al. .............. | 382/187 |
| 6,094,506 A | * | 7/2000 | Hullender .................... | 382/186 |
| 6,275,611 B1 | * | 8/2001 | Parthasarathy .............. | 382/187 |

FOREIGN PATENT DOCUMENTS

| | | |
|---|---|---|
| EP | 0511824 | 11/1992 |
| EP | 0539749 | 5/1993 |
| EP | 0562767 | 9/1993 |
| EP | 0608708 | 8/1994 |
| EP | 0632401 | 1/1995 |
| EP | 0645731 | 3/1995 |
| EP | 0665506 | 8/1995 |

* cited by examiner

Primary Examiner—Bhavesh M. Mehta
Assistant Examiner—Gregory Desire
(74) Attorney, Agent, or Firm—Fitzpatrick, Cella, Harper & Scinto (57) ABSTRACT Stroke information from pen-down to pen-up being one unit is grouped automatically so that editing thereafter can be performed efficiently. Grouping of stroke information is determined in accordance with a predetermined rule of grouping each time stroke information is input or with timing indicated by a user. Strokes input within a predetermined time interval and stroke information input at a position within a predetermined distance interval are assumed to be the same group, and in the editing thereafter, a collective pointing and processing on a plurality of grouped strokes becomes possible.

24 Claims, 6 Drawing Sheets

STROKE DATA

| LVo | Ln | FT | ET | FP | EP | MxP | MnP | P₁ | P₂ | ... | Pn-1 | Pn |

FIG. 2B

CLUSTERING STROKE DATA

| LVn | Ln | FT | ET | FP | EP | MxP | MnP | BD PART |

IMAGE PROCESSING METHOD AND APPARATUS

BACKGROUND OF THE INVENTION

1. Field of the Invention

The present invention relates to an image processing method and apparatus for processing handwritten image information written by an operator.

In particular, the present invention relates to an image processing method and apparatus for handling stroke data formed of a plurality of coordinate information.

2. Description of the Related Art

Generally speaking, as dedicated drawing apparatuses or information processing apparatuses which read and execute a drawing-type application, handwriting information input apparatuses are used which input handwriting information and edit it, for example, input traces drawn by an operator as strokes by using a handwriting input member, such as a pen or a mouse, and edit the input strokes.

Such a handwriting information input apparatus is set in such a way that a trace drawn continuously is input as one stroke, and this one stroke is handled as a minimum unit. Since the apparatus is set so that one stroke is handled as a minimum unit as described above, when the same editing is performed on a plurality of input strokes, a method of grouping a plurality of input strokes into one data is often used so that a plurality of strokes are edited collectively by taking into consideration editing efficiency. As a method of grouping a plurality of input strokes into one data, there is a method in which each object stroke is selected and indicated individually from among the strokes input by the operator, and a plurality of strokes which are indicated so as to be grouped is handled as one data. There is another method in which a plurality of input strokes are grouped by using a grouping command. In this method, an area containing strokes which are grouped by the operator is indicated, and each stroke of this indicated area is handled as one data.

However, in practice, often a plurality of strokes are input in time sequence, and the strokes are interrelated. For example, when characters are input by handwriting by using a pen or the like, often each stroke which forms the character is input in a time sequence, and each stroke which forms this character is handled as one data. Conversely, it is rare that each stroke which forms the character is edited individually.

As described above, in the case where each stroke which forms a handwritten character is handled as one data, in the former method used in the above-described apparatus, each object stroke must be selected and indicated from among the input strokes, and this indication operation requires a lot of time and effort.

In the latter method, although grouping is possible in character units by using a grouping command, it is necessary to indicate an area containing strokes which form a character and further, when a plurality of characters are input close to each other, a very fine indication operation becomes necessary for appropriately dividing the section between the input characters. Therefore, grouping into character units cannot be performed efficiently.

SUMMARY OF THE INVENTION

It is an object of the present invention to provide an image processing method and apparatus capable of efficiently grouping a plurality of input image data without spending time and effort on an operation.

It is another object of the present invention to provide an image processing method and apparatus capable of automatically grouping data according to the intention of the operator.

It is yet another object of the present invention to provide an image processing method and apparatus capable of instructing the execution of a clustering process using a clustering rule according to the intention of the operator.

It is a further object of the present invention to provide an image processing method and apparatus capable of performing editing on strokes which are grouped during input after each stroke is input.

It is still a further object of the present invention to provide an image processing method and apparatus capable of performing a grouping release process on a plurality of data which are grouped during input according to the intention of the operator.

It is still a further object of the present invention to provide an image processing method and apparatus capable of knowing the state of the grouping of input data.

It is still a further object of the present invention to provide an image processing method and apparatus which hold at least one of a clustering level, a stroke input time, stroke coordinate information, positional information, and display attributes as clustering information.

It is still a further object of the present invention to provide an image processing method and apparatus which define positions which are defined by a circumscribed rectangle which surrounds a single stroke or clustered strokes as each positional information.

It is still a further object of the present invention to provide an image processing method and apparatus which use at least one of a difference in input time between strokes, a difference in position between strokes, or a difference in display attributes between strokes as a clustering rule for determining whether or not a plurality of strokes should be grouped.

It is still a further object of the present invention to provide an image processing method and apparatus capable of clustering input strokes more appropriately because a plurality of clustering rules are held and the input strokes are grouped using an adaptively selected clustering rule.

The above and further objects, aspects and novel features of the invention will become more apparent from the following detailed description when read in connection with the accompanying drawings.

DESCRIPTION OF THE PREFERRED EMBODIMENTS

The preferred embodiments of the present invention will be described below with reference to the accompanying drawings.

First Embodiment

Figure 1:
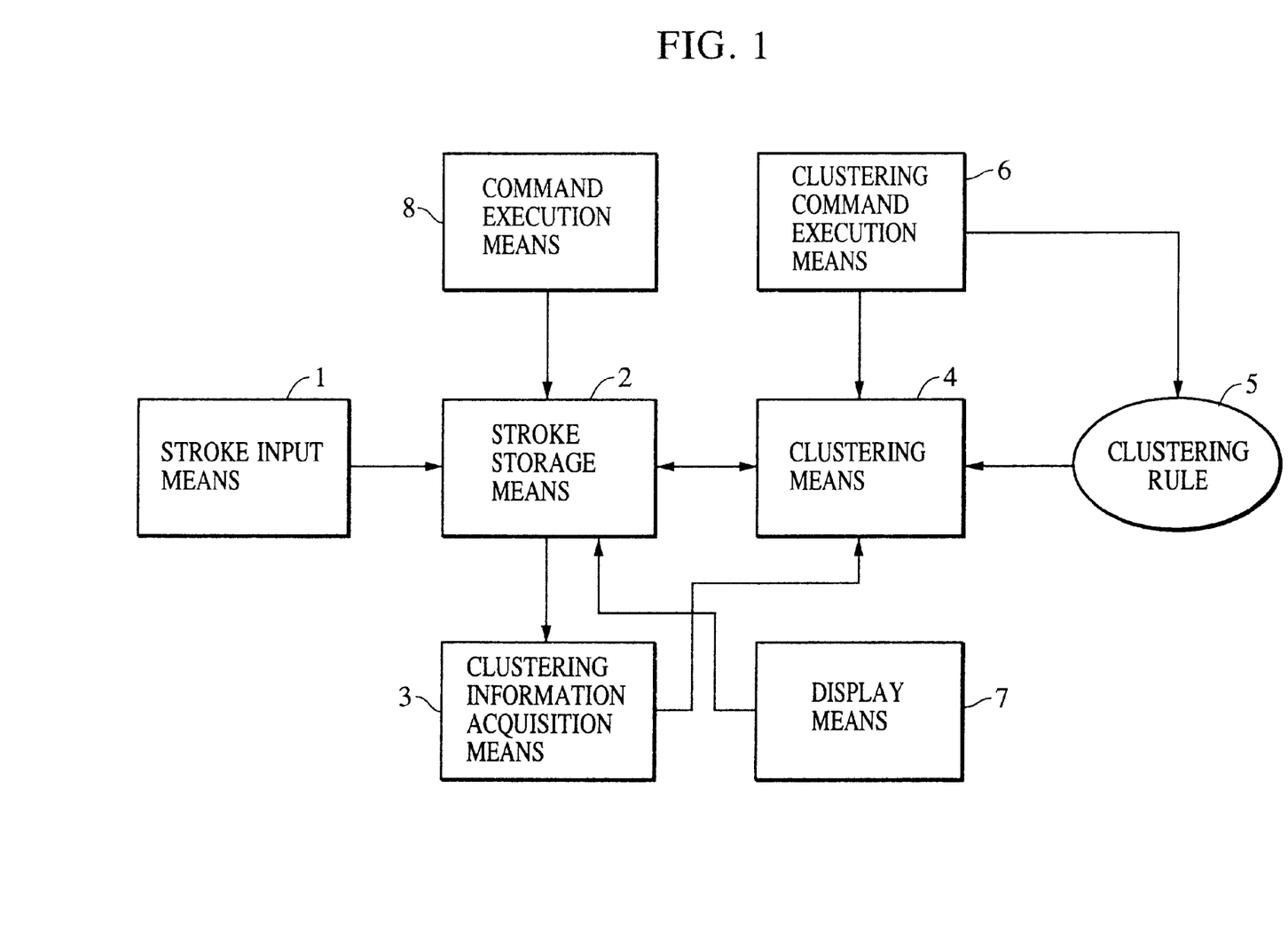
FIG. 1 is a block diagram illustrating the construction of a first embodiment of a handwriting information input apparatus according to the present invention.
Figure 6:
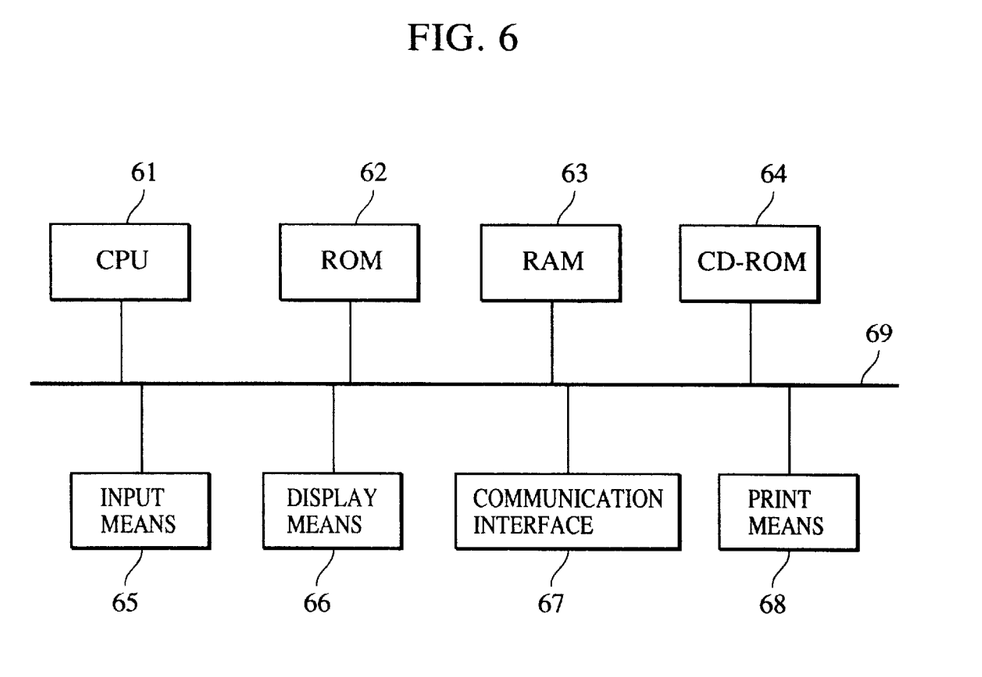
FIG. 6 is a block diagram of the handwriting information input apparatus.

FIG. 1 is a block diagram illustrating the functional construction of a handwriting information input apparatus according to the present invention, which is realized by the apparatus shown in the block diagram of FIG. 6.

The construction shown in FIG. 6 will be described first.

A CPU 61 performs all the processes concerned with the present invention in accordance with control programs stored in a ROM 62, a RAM 63, or a CD-ROM 64. A clustering information acquisition means 3 (FIG. 1), a clustering means 4 (FIG. 1), a clustering command execution means 6 (FIG. 1), and a command execution means 8 (FIG. 1) are controlled by the CPU 61. The ROM 62 has stored therein control programs and parameters used for various processing, by which the CPU 61 performs processes concerned with the present invention such as the process shown in the flowchart (FIG. 4), which will be described later. The RAM 63 also stores control programs and parameters concerned with the present invention, and is provided with a working area for storing data that are generated in the middle of processing. Buffers BufA and BufB, to be described later, are provided within the RAM 63, and stroke data and clustering data are also stored in the RAM 63. A stroke storage means 2, in FIG. 1, is realized by the RAM 63, and a clustering rule 5 is previously stored in the ROM 62. The CD-ROM 64, which can be removed from the main unit of this apparatus, is a storage medium in which control programs for processes concerned with the present invention, which are performed by the CPU 61, and parameters that are required for processes are prestored. The control programs and data stored in the CD-ROM 64 may be used after they are stored temporarily in the RAM 63. Further, in addition to CD-ROMs, the storage media may be floppy disks, magneto-optic disks, IC cards, and the like, as long as they can be removed from the main unit of this apparatus. An input means 65 includes a pointing device and a tablet capable of pointing or selecting a desired position on the display means 66 and a keyboard capable of inputting characters, symbols, functions, modes, and so on. The input means 65 allows inputting of strokes, and a pointing operation of icons, for example, an indication operation of a clustering execute icon or an indication operation of a cluster display icon, which will be described later. The stroke input means 1 in FIG. 1 is realized by the input means 65.

Figure 3:
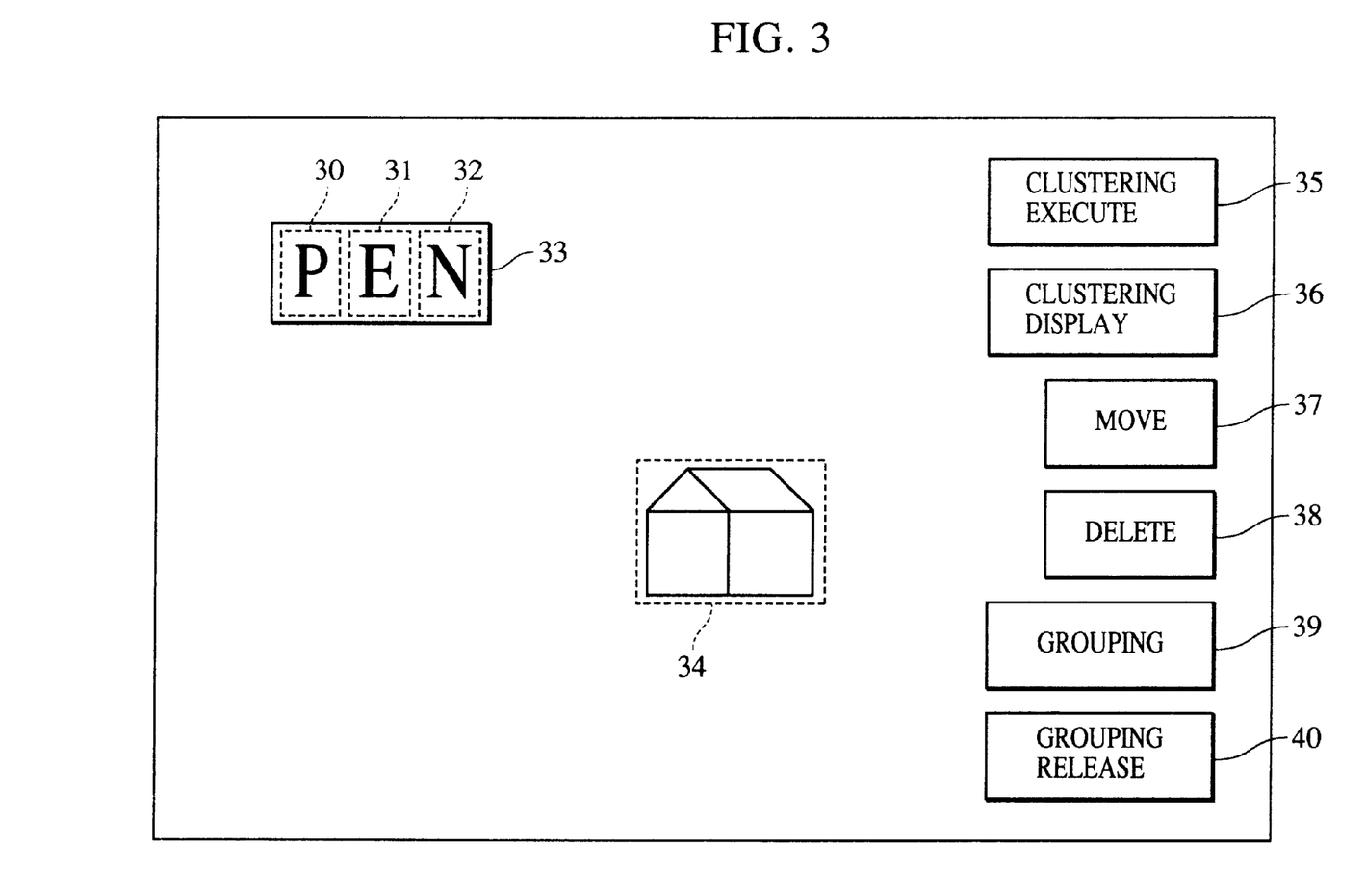
FIG. 3 shows an example of hierarchical clustered stroke data displayed on the display means of the handwriting information input apparatus of FIG. 1.

The display means 66, formed of a CRT or an LCD, displays characters, images, icons, and the like. A display screen, such as that shown in FIG. 3, is generated on this display means 66. The display means 7 in FIG. 1 is realized by the display means 66.

A communication interface 67 controls the communication process for exchange of data with other terminals via a public switched network, a LAN or the like. The control programs of processes concerned with the present invention, which are stored in the RAM 63, may be those read from the memory of other terminals via the communication interface 67. Further, stroke data and process instruction commands may be input via the communication interface 67, and the processed results may be output via the communication interface 67.

The print means 68 prints mid-processing and processed results, and is realized by an LBP or an ink jet printer. A bus 69 interconnects each means and allows data transmission.

The functional structure of FIG. 1 will now be described.

The handwriting information input apparatus comprises a stroke input means 1 provided with a digitizer on the input surface. The stroke input means 1 inputs traces drawn on the input surface by the operator using a pen as stroke data, and further after the stroke data is input, it inputs information about the pen operation progression and operation results. This input stroke data includes coordinate sequence data that is generated in unit time from when the pen contacts the input surface until the pen is moved away from the input surface. The stroke data represented by the coordinate sequence data obtained during this period is handled as one unit of one stroke. Information about the pen operation progression and operation results includes the stroke input time indicating the stroke input start time and end time, and display attributes indicating the pen thickness, and the like.

Figure 2A:
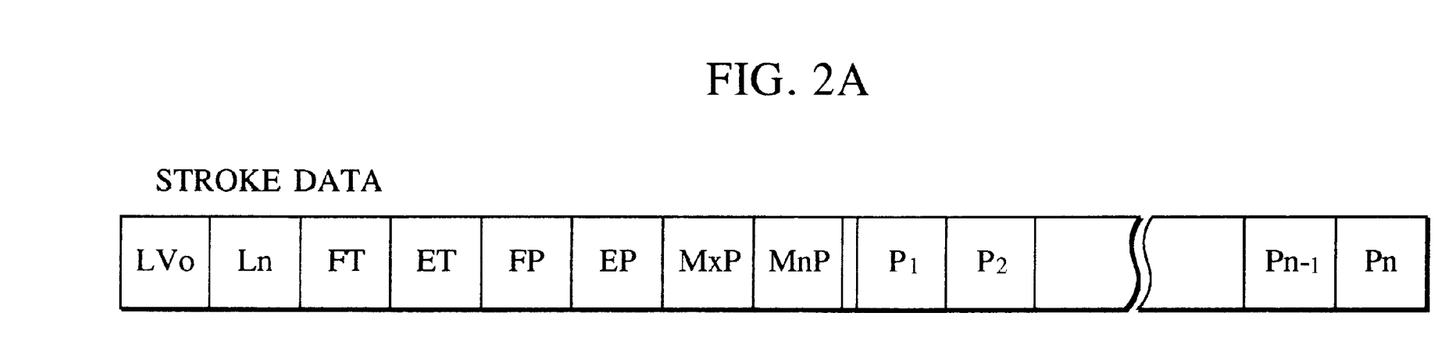
FIGS. 2A and 2B show the format of stroke information stored in stroke storage means of the handwriting information input apparatus of FIG. 1.
Figure 2B:
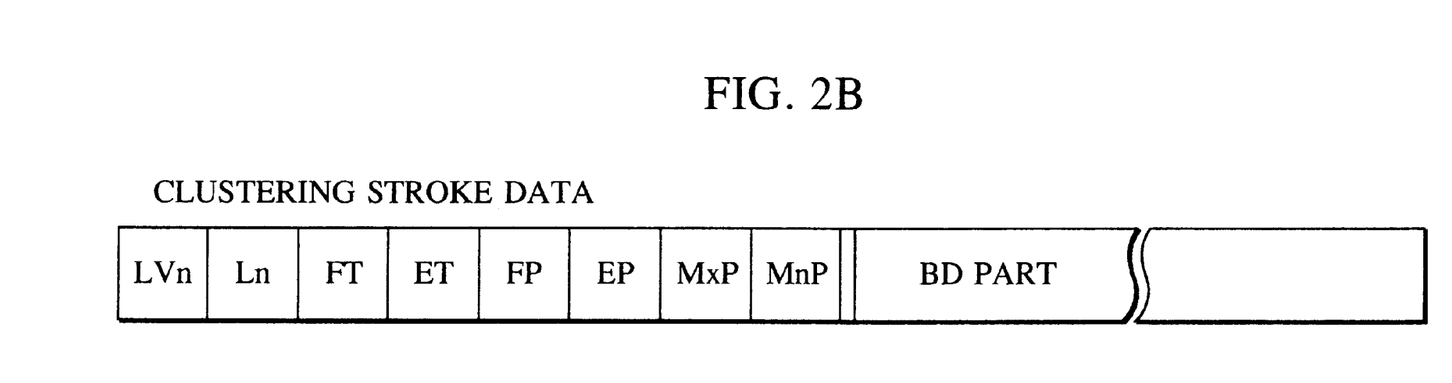

The stroke data input from the stroke input means 1 is related with information about the pen operation progression and operation results and stored in the stroke storage means 2 as stroke information. Further, as will be described later, clustered stroke data such that stroke data belonging to the same group is grouped together is stored as stroke information in the stroke storage means 2. The stroke information of the clustered stroke data and the stroke information of the stroke data are described in different formats so that they may be identified. These formats will be described later with reference to FIG. 2.

Each time a new stroke is input from the stroke input means 1, or each time the execution of a clustering process is instructed from the clustering command execution means 6, a clustering process is performed by the clustering means 4. Specifically, the clustering means 4 performs a first clustering process each time a new stroke is input from the stroke input means 1. In this first clustering process, initially, the possibility of clustering between the new input stroke data and the stroke information (stroke data or clustered stroke data) prestored in the stroke storage means 2 is determined in accordance with the clustering information and a clustering rule 5. When it is determined that clustering of the newly input stroke data with the previously input stroke information is possible, the stroke information which is determined to be capable of being clustered is read from the stroke storage means 2. This read stroke information is grouped with the new input stroke data and converted into clustered stroke information and stored in the stroke storage means 2. That is, the read stroke information is rewritten into the stored stroke information after being converted.

When the execution of clustering is instructed from the clustering command execution means 6, a second clustering process is performed. In this second clustering process, initially, possibility of clustering between the new input stroke data and the stroke information (stroke data or clustered stroke data) prestored in the stroke storage means 2 is determined in accordance with the clustering information and the clustering rule 5. When it is determined that clustering of the newly input stroke with the previously input stroke information is possible, a plurality of stroke information, which is determined as being clustered, is read from the stroke storage means 2. This read stroke information is grouped with the new input stroke data and converted into single clustered stroke information, and stored in the stroke storage means 2. That is, the read stored stroke information is rewritten into the stroke information after being converted.

The clustering information used in the above-described two clustering processes is data required for clustering, and the data are selectively retrieved from the stroke information stored in the stroke storage means 2 by the clustering information acquisition means 3. In this embodiment, as the stroke information, the stroke input start time (FT), the stroke input end time (ET), the stroke start point coordinate (FP), the stroke end point coordinate (EP), and positional information are prepared, and stored in a format such as that shown in FIGS. 2A and 2B (discussed further below). Required information is extracted from the stroke information according to the type of clustering rule. This positional information indicates the position defined by the center coordinate of a circumscribed rectangle that surrounds a single stroke indicated by the stroke information.

The clustering rule 5 is a rule for determining whether or not a plurality of stroke information belong to the same group. Specifically, this is a rule for determining whether or not a plurality of stroke information belong to the same group according to the difference in input time between strokes or the difference in position between strokes. In this embodiment, in the first clustering rule 5 used in the first clustering process, which is performed each time a new stroke is input from the stroke input means 1, when the difference in input time between strokes (between the new input stroke data and the stroke information stored in the stroke storage means 2) is equal to or less than a predetermined value (e.g., 0.5 sec), or when the difference (distance) between the stroke start point or end point of one stroke and the stroke start point or end point of the other stroke is equal to or less than a predetermined value (e.g., 2 mm), it is defined that each stroke belongs to the same group. In comparison with this, in the second clustering rule 5 used in the second clustering process, which is performed when the execution of a clustering process is instructed from the clustering command execution means 6, when the difference (distance) in positional information between the strokes (between the stroke information stored in the stroke storage means 2), namely, the difference between the circumscribed rectangles of each stroke, is equal to or less than a predetermined value (e.g., 3 mm), it is defined that each stroke belongs to the same group. The predetermined values defined by this clustering rule are held within the rule in advance; however, they may be changed according to, for example, an instruction (direct instruction by a numerical value or level instruction) by the user. The reference of clustering of strokes, which are input after the predetermined value is changed, may be changed in accordance with the changing of the predetermined value, or clustering (the same process as the second clustering process) in accordance with a new predetermined value may be performed on all strokes that were input before the changing of the predetermined value.

As described above, the contents of the second clustering rule 5 used for the second clustering process are different from those of the first clustering rule 5 used for the first clustering process. Also, the second clustering process differs from the first clustering process in that clustering between all of the stroke information stored in the stroke storage means 2 is targeted.

The clustering command execution means 6, as described above, is a means for instructing the clustering means 4 to execute the second clustering process. When an instruction operation is performed using a clustering execution icon displayed on the screen of the display means 7, the clustering command execution means 6 generates a command for instructing the clustering means 4 to execute the second clustering process so that the second clustering process described earlier is performed.

The strokes input from the stroke input means 1 are displayed on the display means 7 together with the processing state (clustering state) by the clustering means 4. The display means 7 displays the strokes input from the stroke input means 1 on the basis of the stroke information stored in the stroke storage means 2 and displays the cluster state according to the instruction operation of the cluster display icon. Further, the display means 7 displays various icons, including the above-described clustering execution icon and the cluster display icon. In addition to the clustering execution icon and the cluster display icon, these various icons include icons used in the editing operation of the stroke information stored in the stroke storage means 2. Examples of icons are the icons, "Move", "Delete", "Grouping", and "Grouping Release". Examples of screen displays by this display means 7 will be described later.

When an editing instruction is issued to each of the icons "Move", "Delete", "Grouping", and "Grouping Release", as a result of the operation of the input means 65 by the operator, the instruction is input to the command execution means 8 whereby an editing process on the stroke information stored in the stroke storage means 2 is performed on the basis of the input instruction contents. The editing contents by this "Move", "Delete", "Grouping", and "Grouping Release" are the same as the contents performed normally and therefore, a description thereof has been omitted.

Next, the format of the stroke information stored in the stroke storage means 2 will be described with reference to FIGS. 2A and 2B. FIGS. 2A and 2B show the format of stroke information stored in the stroke storage means of the handwriting information input apparatus of FIG. 1.

As described above, the stroke information of stroke data and the stroke information of clustered stroke data are described in different formats so that they can be identified.

The stroke information of stroke data is data for one stroke from pen-down to the next pen-up and is described by a sequence of data $LV_0$, Ln, FT, ET, FP, EP, $M_xP$, $M_nP$, $P_1$, $P_2$, . . . , and $P_n$, as shown in FIG. 2A. $LV_0$ indicates the clustering level, with data "0" being assigned to $LV_0$ indicating that clustering has not been performed. Ln indicates the data length of this stroke information, and in practice, the number of words (1 word is equal to 16 bits) of the entire stroke data is written therein. FT indicates the stroke data input start time. ET indicates the stroke data input end time. FP indicates the stroke data start-point coordinate. EP indicates the stroke data end-point coordinate. $M_xP$ indicates the maximum coordinates (X, Y) of the stroke data. $M_nP$ indicates the minimum coordinates (X, Y) of the stroke data. That is, $M_xP$ and $M_nP$ indicate the diagonal points of a circumscribed rectangle of a stroke. $P_1$, $P_2$, . . . , and $P_n$ indicate a sequence of points of the coordinates which form the stroke. The above-described coordinates coincide with the coordinates on the screen of the display means 7 and represented by the X–Y coordinate system with the upper left corner of the screen as the origin.

The stroke information of the clustered stroke data is described in a sequence of data $LV_n$, Ln, FT, ET, FP, EP, $M_xP$, $M_nP$, and a BD part, as shown in FIG. 2B. $LV_n$ indicates the clustering level, also indicating the number of times that clustering has been performed. Ln indicates the data length of this stroke information similarly to Ln of the stroke information of the stroke data. The earliest input start time from among all the stroke input start times contained in this clustered stroke data is assigned to FT. The latest input end time from among all the stroke input end times contained in this clustered stroke data is assigned to ET. The start-point coordinate of the stroke having the earliest input start time is assigned to FP. The end-point coordinate of the stroke having the latest input end time is assigned to EP. $M_xP$ indicates the maximum coordinates (X, Y) of all the strokes contained in this clustered stroke data. $M_nP$ indicates the minimum coordinates (X, Y) of the stroke data contained in this clustered stroke data. Inserted into the BD part is clustered stroke data having a clustering level lower than the clustering level indicated by $LV_n$. This makes it possible to realize a hierarchical clustered stroke data structure.

An example of this hierarchical clustered stroke data structure will be described below with reference to FIG. 3. FIG. 3 shows an example of a hierarchical clustered stroke data structure displayed on the display means of the handwriting information input apparatus of FIG. 1.

When each stroke which forms, for example, a character "P" is input as handwriting information at an interval within a predetermined time which is a determination reference for grouping, a first clustering process is performed on each stroke. In the first clustering process, since the difference in input time between the strokes which form the character "P" is below the predetermined time, it is determined that the two strokes which form the character "P" belong to the same group, and clustered stroke data such that each stroke which forms the character "P" is grouped is stored as stroke information in the stroke storage means 2. This clustered stroke data is formed of data in the format shown in FIG. 2B described above, and the $LV_n$ is set to "1". Then, when each stroke which forms the character "E" is input at an interval within the predetermined time, clustered stroke data such that the two strokes which form the character "E" are grouped is stored as stroke information in the stroke storage means 2. Further, a stroke representing a third character "N" is input. Since this writer inputs "N" in one stroke, the stroke data representing "N" is stored in the stroke storage means 2.

When the strokes which form each character of these "P", "E" and "N" are being input, as shown in FIG. 3, the strokes which form each character of the "P", "E" and "N" are displayed each in cluster units on the display screen of the display means 7. Specifically, each character, namely, the cluster unit, is displayed together with rectangles (shown by the dotted lines) 30, 31 and 32 which surround it, and the rectangles 30, 31 and 32 shown by these dotted lines make it possible to know the range in which clustering has been performed.

Following the inputting of each character "P", "E" and "N", when each stroke which forms an object representing a house is input in such a way that the difference (distance) between the start point and the end point between the strokes falls below a predetermined value, the first clustering process is performed even if the difference in input time between the strokes is not below the predetermined time. In the first clustering process, also based on the fact that the difference (distance) between the start point and the end point between the strokes is below the predetermined value, it is determined that these strokes belong to the same group, and clustered stroke data such that each stroke which forms this object is grouped is stored as stroke information in the stroke storage means 2. Similarly to each character "P", "E" and "N", the object, namely, the cluster unit is displayed surrounded by the rectangle (shown by the dotted line) 34. This rectangle is a rectangle expressed by $M_xP$ and $M_nP$ which are stored in the stroke storage means 2.

Together with the stroke or the clustered stroke, a clustering execution icon 35, a clustering display icon 36, a move icon 37, a delete icon 38, a grouping icon 39, and a grouping release icon 40 are displayed on the display screen of the display means 7.

The clustering execution icon 35 is an icon for instructing the execution of the above-described second clustering process. When this clustering execution icon 35 is pointed to, the second clustering process is performed on all of the stroke information stored in the stroke storage means 2. For example, when the clustering execution icon 35 is clicked on and the second clustering process is performed on all the stroke information shown in FIG. 3, the difference in positional information between each clustered stroke data of the characters "P", "E" and "N" and the stroke data, namely, the difference between each clustered stroke and the circumscribed rectangle (the rectangles 30, 31 and 32 in FIG. 3) is found to be equal to or less than a predetermined value, it is determined that each clustered stroke and the stroke belong to the same group, and stroke information including each clustered stroke of "P", "E" and "N" and the stroke is generated. That is, this stroke information indicates a hierarchical data structure including each clustered stroke of "P", "E" and "N" and the stroke, and a rectangle 33 shown by the solid line which surrounds "P", "E" and "N" is displayed as the clustering execution results on the display means 7.

The clustering display icon 36 is an icon for changing the display format of the clustered stroke data. Each time this icon is pointed to, the display format of the clustered stroke data is changed. Specifically, in a state in which the clustered stroke data is displayed surrounded by a rectangle as described above, when the clustering display icon 36 is pointed to, the displayed rectangle is deleted, and only the clustered stroke data is displayed.

The move icon 37, the delete icon 38, the grouping icon 39, and the grouping release icon 40 are icons used for editing operations as described above. The pointing to of the move icon 37 sets the move mode, making possible an editing operation for performing a movement in cluster units. The delete icon 38 is an icon for performing deletion in cluster units. The grouping icon 39 is an icon for performing grouping in the same way as in a conventional drawing-type application. As a result of the pointing to of this icon, a grouping mode is set. In this grouping mode, clustered stroke data or stroke data, which forms cluster units, is selected by the operator. When the grouping icon 39 is pointed to after this selection is completed, the selected clustered stroke data or stroke data is grouped as one cluster. When a particular editing operation is performed on this cluster, editing of the same contents is performed on all of the clustered stroke data or the stroke data contained in this cluster. The grouping release icon 40 is an icon for separating the cluster which is grouped in accordance with an instruction from the grouping icon 39 to the original data. By specifying the grouped cluster after this icon is pointed to, the BD part of the data having the highest-order clustering level from among the data indicating the cluster is made to remain and the other parts are deleted.

Figure 4:
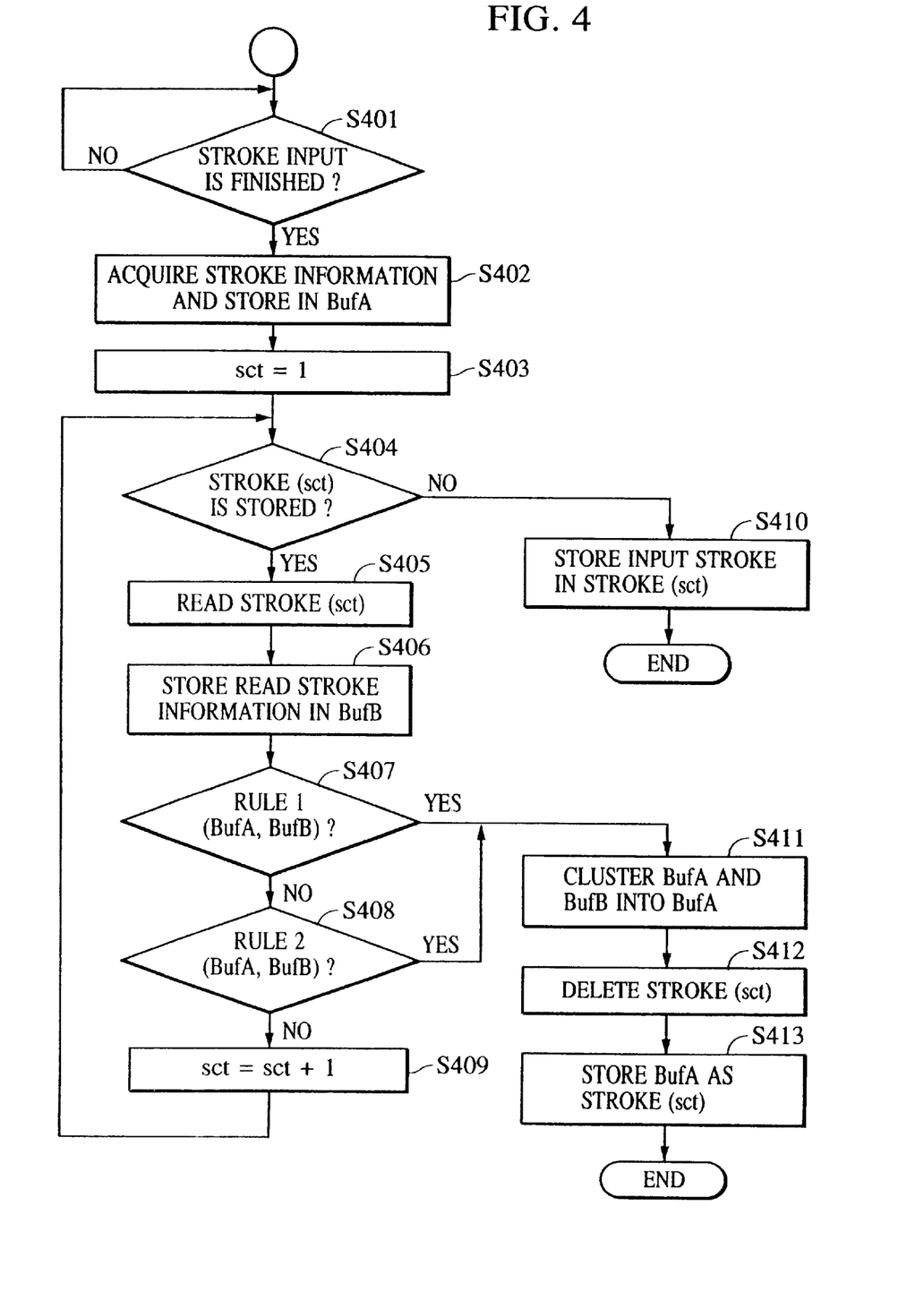
FIG. 4 is a flowchart illustrating the procedure of a first clustering process in the handwriting information input apparatus of FIG. 1.

Next, the procedure of the first clustering process when a stroke is input will be described with reference to FIG. 4. FIG. 4 is a flowchart illustrating the procedure of the first clustering process in the handwriting information input apparatus of FIG. 1.

When stroke input using a pen from the stroke input means 1 is started, as shown in FIG. 4, in the initial step S401, whether or not stroke input is finished is monitored. When it is determined that the stroke input is finished, the process proceeds to step S402 where clustering information is acquired on the basis of the input stroke and stored in a buffer BufA. Clustering information to be stored in the buffer BufA is each of the data from $LV_0$ to EP shown in FIG. 2A.

In the subsequent step S403, a stroke information counter sct is initialized to "1". This stroke information counter sct makes it possible to sequentially access the stroke information stored in the stroke storage means 2.

Next, the process proceeds to step S404 where a check is made to determine whether or not stroke information corresponding to the count value sct of the stroke information counter sct has been stored in the stroke storage means 2. When stroke information corresponding to the count value sct is not present, the process proceeds to step S410 where the stroke information indicating the input stroke is stored at a position corresponding to the count value sct of the stroke storage means 2. The stroke information stored herein is data of the format shown in FIG. 2A. After the stroke information indicating this input stroke is stored, this process is terminated.

When stroke information corresponding to the count value sct is present, the process proceeds to step S405 where stroke information (stroke information (sct)) corresponding to this count value sct is read from the stroke storage means 2. In the subsequent step S406, this stroke information which has been read is stored in the buffer BufB.

Next, the process proceeds to step S407 where the possibility of grouping the input stroke and the read stroke information is determined by comparing the information which becomes the clustering information for the buffer BufA with the clustering information for the buffer BufB in accordance with rule 1, which is a time comparison rule, of the first clustering rule 5 used in the first clustering process. Specifically, the difference between FT of the buffer BufA and ET of the buffer BufB is computed, thus determining whether or not the condition in which this difference, that is, the difference in input times, is equal to or less than the input time difference 0.5 seconds defined by the rule 1 is satisfied. When the condition of the input time difference defined by this rule 1 is satisfied, it is determined that the input stroke and the read stroke information can be grouped, that is, clustering is possible. When the condition of the input time difference is not satisfied, it is determined that clustering is not possible.

When it is determined that clustering based on the condition of the input time difference defined by rule 1 is not possible, the process proceeds to step S408 where the possibility of grouping the input stroke and the read stroke information is determined by comparing the information which becomes the clustering information for the buffer BufA with the clustering information for the buffer BufB in accordance with rule 2, which is a position comparison rule, of the first clustering rule 5 used in the first clustering process. Specifically, the difference between FP of the buffer BufB and FP of the buffer BufA or the difference between EP of the buffer BufB and EP of the buffer BufA is computed, and a check is made to determine whether or not the condition in which this difference, that is, the difference in input positions, is equal to or less than the input position difference 2 mm defined by the rule 2 is satisfied. When the condition of the input position difference defined by this rule 2 is satisfied, it is determined that the input stroke and the read stroke information can be grouped, that is, clustering is possible. When the condition of the input position difference is not satisfied, it is determined that clustering is not possible.

When it is determined that the clustering based on the condition of the input position difference defined in rule 2 is not possible, the process proceeds to step S409 where the count value sct of the stroke information counter sct is incremented by 1, and the process from step S404 is repeated.

When it is determined in step S407 that clustering based on the condition of the input time difference defined by rule 1 is possible, or when it is determined that clustering based on the condition of the input position difference defined by rule 2 is possible, the process proceeds to step S411 where clustering of the input stroke and the read stroke information is performed.

Specifically, a process corresponding to the value of the clustering level $LV_n$ of the stroke information read from the stroke storage means 2 is performed. When the value of the $LV_n$ of the read stroke information is 1 or more, information of the buffer BufA is written into the BD part of the read stroke information and the read stroke information is updated. This read stroke information after being updated is stored in the buffer BufA, and the information stored in the buffer BufA becomes information such that the input stroke and the read stroke information are grouped, and the data length of this information is expressed by an equation (1) below:

$$Ln \text{ of } BufA = Ln \text{ (before being clustered) of } BufA + Ln \text{ (before being clustered) of } BufB \quad (1)$$

When the value of $LV_n$ of the read stroke information is $0 (=LV_0)$, $LV_n$, Ln, FT, FP, $M_xP$, and $M_nP$ of the buffer BufA can be rewritten in accordance with the following equations (2) to (7):

$$LV_n \text{ of } BufA = 1 \quad (2)$$

$$Ln \text{ of } BufB = Ln \text{ (before being clustered) of } BufA + Ln \text{ (before being clustered) of } BufB \quad (3)$$

$$FT \text{ of } BufA = FT \text{ of } BufB \quad (4)$$

$$FP \text{ of } BufA = FP \text{ of } BufB \quad (5)$$

$$M_xP \text{ of } BufA = MAX(M_xP \text{ of } BufA, M_xP \text{ of } BufB) \quad (6)$$

$$M_nP \text{ of } BufA = MIN(M_nP \text{ of } BufA, M_nP \text{ of } BufB) \quad (7)$$

In this BufA, following $M_nP$, a BD part is added in which the read stroke information and the input stroke information are written. The information stored in this BufA becomes information such that the input stroke and the read stroke information are grouped.

When the information after being clustered is stored in the BufA as described above, the process proceeds to step S412 where the read stroke information, namely, the stroke information (sct) is deleted from the stroke storage means 2, and in the subsequent step S413, the information of the buffer BufA is stored as stroke information at the storage position of this read stroke information. After this stroke information is stored, this process is terminated.

As a result of the above, in this embodiment, the possibility of clustering this input stroke and the previously input stroke is determined in accordance with clustering rule 5 each time a stroke is input from the stroke input means 1. When it is determined that clustering is possible, stroke information is generated such that this input stroke and the previously input stroke are grouped; therefore it is possible to group a plurality of input strokes efficiently without spending much time and effort on an operation.

In this embodiment, two rules, of which one is based on the condition of the input time difference and the other on the input position difference, are each applied individually as clustering rule 5 used in the first clustering process performed when a stroke is input. It is not necessary, however, to limit to these rules, and further, it is also possible to increase the number of rules to be applied and to determine the possibility of the execution of clustering so as to perform clustering.

Further, the contents of conditions of the rules to be applied are not limited to the above-described conditions and may be conditions obtained from the stroke information. Needless to say, it is possible to set various conditions.

Next, a description will be given of a second clustering process performed in accordance with an instruction from the clustering execution icon 35. In the second clustering process, as described above, a second clustering rule 5 is applied such that when the difference (distance) in position information between strokes (between stroke information stored in the stroke storage means 2), that is, the difference of the distance between the circumscribed rectangles of each stroke, is equal to or less than a predetermined value (e.g., 3 mm), each stroke belongs to the same group. The second clustering process is different from the first clustering process in that clustering between all the stroke information stored in the stroke storage means 2 is the object.

Based on such a difference with the first clustering process, in this process, initially, waiting for an input of pointing to the clustering execution icon 35 is done. When there is an input of pointing to the clustering execution icon 35, the second clustering process is invoked. Then, the object stroke information is read from the stroke storage means 2, stored in the buffer BufA, and then stroke information for a candidate of the stroke information of the buffer BufA is read and stored in the buffer BufB.

Next, a check is made to determine whether or not the condition is satisfied in which the difference between $M_xP$ of BufA and $M_nP$ of BufB or the difference (difference in distance between the circumscribed rectangles) between $M_nP$ of BufA and $M_xP$ of BufB is equal to or less than a predetermined value, that is, 3 mm. When this condition of the difference in distance between the circumscribed rectangles is satisfied, it is determined that the stroke information of the buffer BufA and the stroke information of the buffer BufB can be grouped, that is, clustering is possible. When this condition of the distance between the circumscribed rectangles is not satisfied, it is determined that clustering is not possible.

When it is determined that the clustering based on this condition is not possible, stroke information which is the next candidate is read, and the above-described process is repeated.

When it is determined that the clustering based on this condition is possible, clustering of the stroke information of the buffer BufA and the stroke information of the buffer BufB is performed. Although the method of updating the stroke information on the basis of this clustering is the same as the updating method in the first clustering process, this method is different in that as a result of the storing of the updated stroke information in the stroke storage means 2, the stroke information of the buffer BufA and the stroke information of the buffer BufB are deleted from the stroke storage means 2.

As described above, by pointing the clustering execution icon 35, it is possible to read consecutively the object stroke information and the stroke information for a clustering candidate thereof from the stroke storage means 2 and to group automatically each stroke information close to each other, making it possible to provide the operator with a simple and efficient operation environment.

When the results of grouping obtained by the first or second clustering process are contrary to the intention of the user, it is possible to release the grouping in accordance with the pointing to of the grouping release icon 40, making possible an editing operation in accordance with the intention of the user.

Although in this embodiment two buffers, BufA and BufB, are provided as an information storage area and a work area, the information storage area and the work area are not limited to these buffers BufA and BufB and may be storage means in which both a stroke information storage area and a work area are allocated.

Second Embodiment

Figure 5:
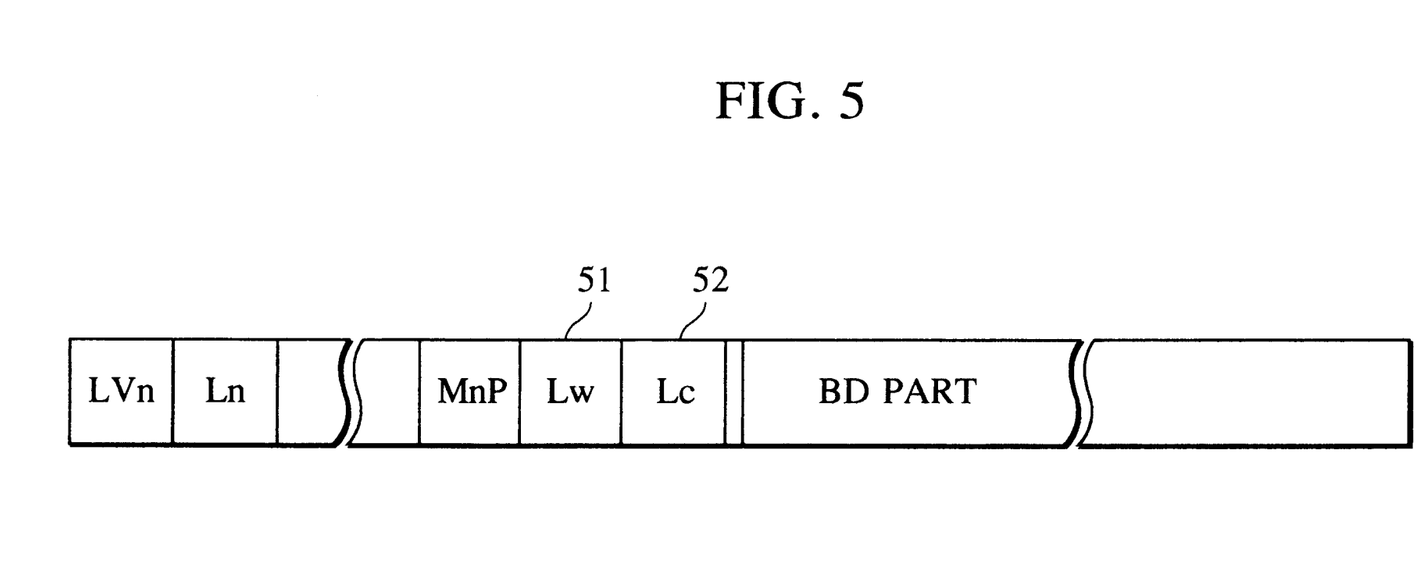
FIG. 5 shows the format of stroke information stored in stroke storage means of a second embodiment of a handwriting information input apparatus according to the present invention.

Next, a second embodiment of the present invention will be described with reference to FIG. 5. FIG. 5 shows the format of stroke information stored in stroke storage means in the second embodiment of a handwriting information input apparatus according to the present invention.

The construction of this embodiment is the same as the construction of the above-described first embodiment and therefore, a description thereof has been omitted. The second embodiment is different from the first embodiment in that a second clustering process is performed by applying a clustering rule in which conditions of display attributes are added, and this difference will be described below.

In this embodiment, when the execution of a clustering process is instructed from the clustering command execution means, a second clustering process is performed. The clustering rule used in this second clustering process defines that when the difference (distance) in position information between the strokes (between the stroke information stored in the stroke storage means), i.e., the difference in distance between the circumscribed rectangles of each stroke, is equal to or less than a predetermined value (3 mm) and the display attributes are the same, then each stroke belongs to the same group. Here, the display attributes refer to the thickness and color of a line that forms a stroke, and the like. In this embodiment, the thickness and the color of the line that forms a stroke are used as the display attributes.

As a result of adopting a rule in which the display attributes of the thickness and color of this line are added, the thickness and color of the line are added to the stroke information. To be specific, as shown in FIG. 5, the stroke information of the clustered stroke data is described in a format formed of a sequence of data $LV_n$, Ln, FT, ET, FP, EP, $M_xP$, $M_nP$, $L_w$ 51, $L_c$ 52, and a BD part. $L_w$ 51 is data indicating the thickness of the line, and $L_c$ 52 is data indicating the color of the line. Although the stroke information of the stroke data (which corresponds to the stroke information shown in FIG. 2A) is not shown in the figure, the stroke information is such that the above-described $L_w$ and $L_c$ are added to the stroke information shown in FIG. 2A.

In the second clustering process, through the application of the above-described clustering rule, it is determined that each stroke can be grouped when the difference in distance between the strokes is equal to or less than a predetermined value (3 mm) and the display attributes are the same, and each stroke is grouped into the same group. Since the condition in which the display attributes are the same is added as a condition for clustering as described above, it becomes possible to perform more appropriate grouping. For example, in the case where an editing operation for changing the thickness and the color of the line of the input stroke is possible, when it is not desired to group one and the other of the strokes which are input close to each other into one, the thickness and the color of the line of either one of the strokes are changed before the second clustering process is performed. This prevents one and the other of the strokes which are input close to each other from being grouped, making it possible to obtain the grouping results appropriate for the intention of the operator.

Further, when performing grouping using a grouping icon, an editing operation for changing the display attributes $L_w$ and $L_c$ of each stroke, contained in the grouped cluster, is performed. Through this editing operation, the display attributes of each stroke contained in the grouped cluster are changed so as to become the same attributes, and the clustered stroke within each stroke is set in such a way that only the display attributes of the clustered stroke having the highest-order clustering level are changed.

When the cluster grouped by the grouping release icon is decomposed to the original data, similarly to the first embodiment, the BD part of the data having the highest-order clustering level of the data indicating the specified cluster is made to remain and the other parts are deleted. However, in the display of each datum after the decomposition, the display attribute are held, and each datum is displayed on the basis of the held display attributes.

Although in this embodiment the thickness and the color of the line are used as the display attributes which are used as the clustering conditions, in place of these, display attributes with reference to the stroke input environment (e.g., an input environment on a drawing-type application), such as a line type, for example, a solid line or a dotted line, or the shape of the pen point, may be used. Further, items with a larger number of display attributes may be added or set as the clustering conditions.

Furthermore, needless to say, by setting so that the display attributes for each stroke are stored in other storage areas in such a manner as to correspond to the stroke, the format of the stroke information can be made to be the same format as that of the first embodiment.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information input method, comprising the steps of:
  inputting stroke information which represents one stroke handwritten by a user;
  storing the input stroke information;
  determining whether or not a clustering rule is satisfied each time new stroke information representing one stroke is input, by comparing the new input stroke information with the stored stroke information; and
  storing clustering information generated by clustering the new input stroke information representing one stroke and the stored stroke information, when said determining step determines that the new input stroke information satisfies the clustering rule.

2. An information input method according to claim 1, wherein the input stroke information contains a sequence of coordinate points which are input in succession.

3. An information input method according to claim 1, wherein the input stroke information contains a sequence of coordinate points which are input in succession and time information at which the sequence of coordinate points are input.

4. An information input method according to claim 1, wherein the clustering rule contains a threshold value used for a determination criterion for determining whether or not a plurality of stroke information should be grouped.

5. An information input method according to claim 4, wherein said threshold value is distance information.

6. An information input method according to claim 4, wherein said threshold value is time information.

7. An information input method according to claim 4, wherein said threshold value is a variable value.

8. An information input method according to claim 1, wherein the stored stroke information comprises both single stroke information and clustered stroke information such that a plurality of strokes are grouped.

9. An information input method according to claim 8, wherein a group of the plurality of clustered strokes are output in such a manner as to be identified.

10. An information input method according to claim 8, further comprising a step of displaying the stored stroke information, wherein a frame is displayed surrounding the plurality of clustered strokes in addition to the stroke information.

11. An information input method according to claim 1, wherein the input stroke information is handwritten information.

12. An information input method according to claim 1, wherein the clustering information storing step stores new clustering information generated on the basis of the new input stroke information, when said determining step determines that the new input stroke information does not satisfy the clustering rule.

13. An information input apparatus, comprising:
  input means for inputting stroke information which represents one stroke handwritten by a user;
  storage means for storing stroke information input from said input means;
  determination means for determining whether or not a clustering rule is satisfied each time new stroke information representing one stroke is input, by comparing the new input stroke information with the stored stroke information; and
  clustering means for performing control so that, when new input stroke information is determined to satisfy the clustering rule by said determination means, clustering information is generated by clustering the new input stroke information representing one stroke and the stored stroke information, and the clustering information is stored in said storage means.

14. An information input apparatus according to claim 13, wherein the input stroke information contains a sequence of coordinate points which are input in succession.

15. An information input apparatus according to claim 13, wherein the input stroke information contains a sequence of coordinate points which are input in succession and time information at which the sequence of coordinate points are input.

16. An information input apparatus according to claim 13, wherein the clustering rule contains a threshold value used for a determination criterion for determining whether or not a plurality of stroke information should be grouped.

17. An information input apparatus according to claim 16, wherein the threshold value is distance information.

18. An information input apparatus according to claim 16, wherein the threshold value is time information.

19. An information input apparatus according to claim 16, wherein the threshold value is a variable value.

20. An information input apparatus according to claim 13, wherein said storage means stores both single stroke information and clustered stroke information such that a plurality of strokes are grouped as stroke information.

21. An information input apparatus according to claim 20, wherein there is provided output means for outputting a group of said plurality of strokes clustered by said clustering means in such a manner as to be identified.

22. An information input apparatus according to claim 20, further comprising display means for displaying the stored stroke information and displaying a frame which surrounds said plurality of strokes clustered by said clustering means in addition to the stroke information.

23. An information input apparatus according to claim 13, wherein the stroke information is handwritten information.

24. A computer-readable storage medium containing program codes to control a computer to perform the following steps:

inputting stroke information which represents one stroke handwritten by a user;

storing the input stroke information;

determining whether or not a clustering rule is satisfied each time new input stroke information representing one stroke is input, by comparing the new input stroke information with the stored stroke information; and     storing clustering information generated by clustering the new input stroke information representing one stroke and the stored stroke information, when it is determined that the new input stroke information satisfies the clustering rule.

\* \* \* \* \*

UNITED STATES PATENT AND TRADEMARK OFFICE
CERTIFICATE OF CORRECTION

PATENT NO. : 6,567,552 B2
DATED : May 20, 2003
INVENTOR(S) : Katsuhiko Sakaguchi et al.

It is certified that error appears in the above-identified patent and that said Letters Patent is hereby corrected as shown below:

Title page,
Item [*] Notice, please insert: -- This patent issued on a continued prosecution application filed under 37 CFR 1.53(d), and is subject to the twenty year patent term provisions of 35 U.S.C. 154(a)(2). --.

Signed and Sealed this

Thirtieth Day of March, 2004

JON W. DUDAS
*Acting Director of the United States Patent and Trademark Office*